April 16, 1940.   L. M. MOTT-SMITH   2,197,190

CONSTANT TEMPERATURE BATH

Filed Aug. 4, 1936

Inventor
Lewis M. Mott-Smith.

Patented Apr. 16, 1940

2,197,190

UNITED STATES PATENT OFFICE 2,197,190

CONSTANT TEMPERATURE BATH

Lewis M. Mott-Smith, Houston, Tex.

Application August 4, 1936, Serial No. 94,293

3 Claims. (Cl. 236—1)

This invention relates in general to temperature regulating devices, and more particularly has reference to a means for regulating the temperature of a constant temperature bath for the purpose of maintaining an instrument in such bath at a constant operating temperature.

Many scientific instruments are of such nature that they must necessarily be maintained at a constant temperature within a very small range in order for them to produce reliable results. The purpose of the present invention is to provide a constant temperature bath for such instruments and particularly a means for maintaining such bath at a constant temperature for a geological surveying instrument known as a gravity meter.

It is an object of the present invention to provide a constant temperature bath having a temperature variation of less than one one thousandth of a degree Fahrenheit.

It is a further object of this invention to provide a temperature regulating device for such a bath which will not be substantially affected in its operation by rough handling such as is necessary in transporting a gravity meter type of instrument from one place to another.

It is a further object to provide a temperature regulator which will not depend upon mechanical movement for the translation of temperature changes into such form that they may control the supply of energy for heating the bath.

Another object is to provide a constant temperature bath which will have a substantially uniform temperature throughout.

Another object is to provide a device for accurately maintaining a bath at a constant temperature with a minimum of adjustment and attention.

Other objects and advantages will become apparent from the following description and from the accompanying drawing wherein is illustrated by way of example one embodiment of this invention. It is to be understood that this disclosure is not to be construed by way of limitation, but by way of illustration only, and that this invention is to be limited in its scope only by the prior art and by the terms of the appended claims.

Referring now to the drawing in which like numerals indicate corresponding parts throughout:

Figure 1:
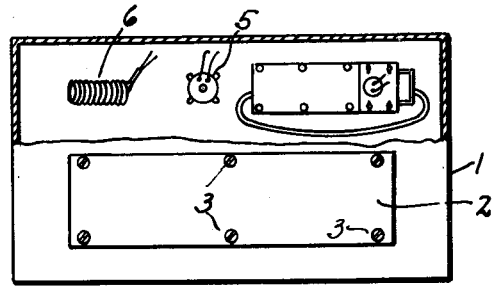
Fig. 1 is a plan view with parts broken away to illustrate the disposition of the temperature responsive unit with respect to the other elements hereinafter described.

Referring now more in detail to Fig. 1, it is noted that a thermally insulated case 1 is provided for the constant temperature bath which in the present embodiment is a liquid bath, and in which is adapted to be suspended the surveying or other instrument. Such instrument is preferably secured to the lower side of a plate 2 held in place by suitable means such as bolts 3.

The temperature responsive device which is suspended from the plate 4 is likewise placed in the bath and is connected as hereinafter described to control the operation of a mixer or circulating device 5. A heating coil 6 may also be employed as hereinafter described.

It will be understood that while in this instance the bath is preferably a liquid bath, it may be a gaseous bath such as air or the like.

Figure 2:
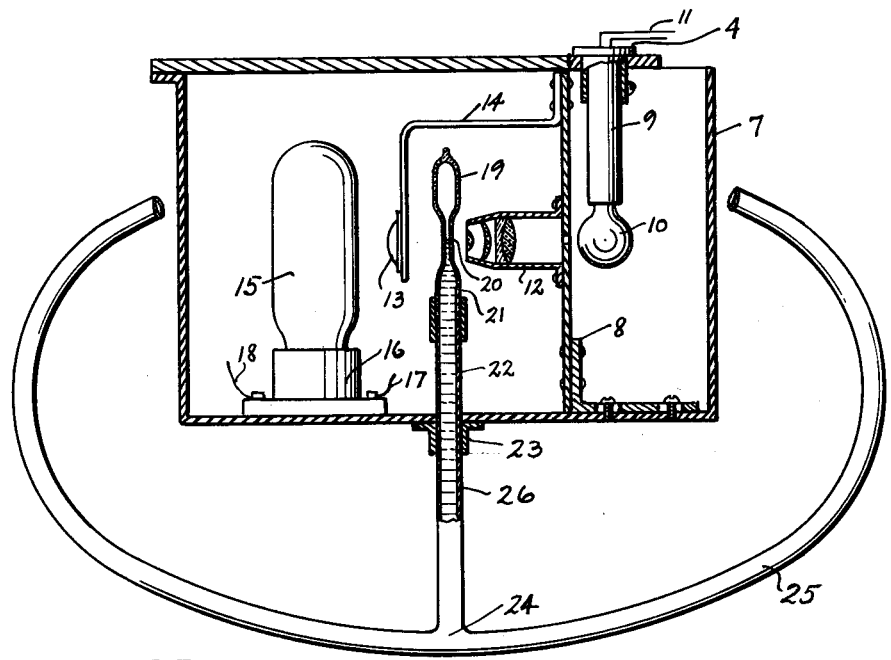
Fig. 2 is an enlarged side elevation of the temperature responsive unit shown partly in section.

Referring now to Fig. 2, it will be seen that an inclosure in the form of a box 7 is secured to the under-face of the plate 4 which appears in Fig. 1, and that this inclosure or box is divided into two compartments by means of a partition 8 which prevents light from passing from one compartment to the other except through an opening provided therefor.

Suspended within one of the compartments is a bracket 9 carrying an electric lamp 10 in the lower end thereof, said lamp being supplied with current through leads 11 which pass out through the plate 4. In alignment with the filament of the lamp 10 and an opening through the partition 8 is a microscope objective 12 for the purpose of converging the rays from the lamp 10 through a focal point and onto the condensing lens 13 which is supported by suitable means such as a bracket 14. The condensing lens in turn serves to throw the rays from the lamp 10 onto the photo electric cell 15 which is mounted on a suitable base 16 and provided with electrical leads 17 and 18.

The partition 8, as illustrated, is adjustably mounted for movement toward and away from the lamp 10 to adjust the position of the focal point of the light from the microscope objective 12. The mounting for the lamp 10 is also adjustable laterally to position a central portion of the filament directly before the opening in the partition.

Figure 3:
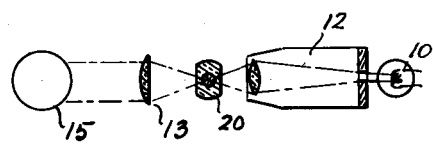
Fig. 3 is a diagrammatic illustration of the transmission of light to the photo electric cell when too high a temperature exists.
Figure 4:
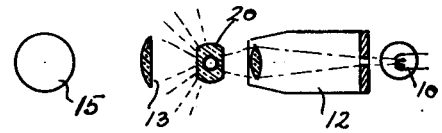
Fig. 4 is a similar illustration showing the conditions when the temperature is not high enough.

Located between the microscope objective 12 and condensing lens 13 is a glass tube having an enlarged bulb 19 at the upper end thereof and a reduced capillary section 20 having a certain point on its bore positioned substantially at the focal point of the light issuing from the microscope objective. This reduced section 20 is preferably flattened on its opposite faces as illustrated in Figs. 3 and 4, so that, when filled with a liquid of substantially the same refractive index as glass, as herein described, the light beam will pass freely from the objective lens 12 into and through the tube. The flattening is particularly desirable on that side of the tube from which the light beam comes, as it enables the beam to penetrate the tube as it would a glass plate, without any diffusion or scattering of the light such as would be caused by the beam impinging on a convex surface. The tube is enlarged at its lower end 21 where it abuts and forms a sealed connection with the upper end of the tube 22 which may be constructed of copper or other good heat conductive material. This tube 22 passes downwardly through the lower wall of the inclosure 7 and a seal 23 is formed thereabout so as to prevent the entry into the inclosure 7 of any of the liquid or gas forming the temperature bath. At some distance below the seal 23 the tube 22 is joined as shown at 24 to a relatively large closed coil 25. This coil extends out on each side of the tube 22 into different portions of the bath, and provides a relatively great surface area in contact with the bath, thus the more readily to exchange heat therewith. Such a coil is more sensitive and responds more accurately to temperature changes of the bath than would the usual bulb. Within the tube 22, the coil 25, the glass bulb 19 and tube 20 is sufficient liquid to fill this system up to the point where the light strikes the capillary tube 20 when the temperature of the system is exactly that which it is desired to maintain in the bath. It will readily be seen that when this temperature increases the capillary 20 will be filled and the excess fluid will flow into the bulb 19, and that when the temperature falls the capillary tube 20 will be emptied and the level of the fluid will fall therebelow into the portion 21. The liquid employed in the coil 25, tube 22, capillary 20, etc. is preferably some liquid, such as toluene, for example, which is transparent and has an index of refraction substantially the same as that of glass.

Figure 5:
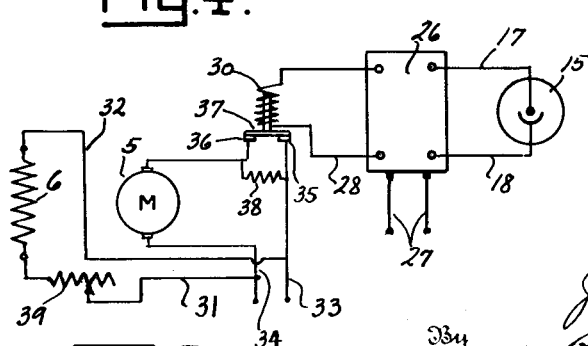
Fig. 5 is an electrical diagram illustrating one form of hook-up for the device for heating the bath.

Referring now to Fig. 5, it is noted that the leads 17 and 18 from the photo electric cell, or other light responsive device 15, are connected to an amplifier 26 of any suitable type to which supplemental power from a source 27 may be supplied. The output of this amplifier 26 is connected by means of leads 28 and 29 to the coil 30 of a relay.

The motor 5 of the mixing device or circulator, and the heating coil 6 are preferably connected in parallel by means of leads 31 and 32, and the motor 5 is supplied through leads 33 and 34 from a common source of electrical energy. One of these leads 33 is interrupted and provided with contacts 35 and 36 adapted to be connected by the bar 37 representing the movable portion of the relay above referred to. It is noted that when no current is put out by the amplifier 26, and the coil 30 is not energized, the bar 37 will drop so as to connect the contacts 35 and 36 and supply energy to the motor 5 and heating coil 6. A fixed resistance 38 is permanently bridged across the interruption of the lead 33.

A variable resistance 39 is inserted in the heater lead 31 for manually varying the energy supplied to this heater coil 6.

While it is believed that the operation will be clear from the foregoing, it may be stated by way of explanation that the coil 25, as well as the inclosure 7, are substantially immersed in the bath. The resistance 39 is manually adjusted to constantly inject into the bath only a little less heat than is required to maintain the desired temperature. When the temperature of the bath is as high as desired, the capillary tube 20 at the focal point of the light passing from the microscope objective 12 will be full of the fluid 26. This fluid being of such a nature that it has substantially the same index of refraction as the glass itself of which the tube is composed, the effect when the tube is full is much the same as though it were a solid rod of glass, and since it has flat surfaces the light will be transmitted therethrough and will be condensed by the lens 13 upon the cell 15 as shown in Fig. 3. This in turn will cause the output from the amplifier 26 to energize the coil 30 and raise the bar 37, thus preventing any energy being supplied to the motor 5 except that passing through the resistance 38. This is sufficient to keep the stirrer moving slowly and the bath circulating, but is insufficient, even with the heat supplied by the heater coil 6, to maintain the desired temperature of the bath.

When the temperature of the bath falls below the desired point, the tube 20 at the focal point will be left empty, and the light focused thereon by the microscope objective 12 will strike the refractive surface of the tube walls and be dispersed thereby, so that very little if any of this light will pass to the lens 13 or to the cell 15. When this takes place the supply of energy from the amplifier 26 will be interrupted and the coil 30 will be de-energized, permitting the bar 37 to close the circuit between the contacts 35 and 36 and supply the maximum energy to the motor 5. The stirrer is so designed that it will now deliver to the fluid of the bath sufficient energy in the form of internal friction in the fluid, to raise the temperature of the fluid bath until the expansible liquid in the capillary tube again rises past the focal point of the projected light ray.

While a photoelectric cell has been referred to in the foregoing description, it will be appreciated that any suitable light responsive device may be employed in a manner readily apparent.

It is likewise apparent that while there has been disclosed a system in which the fluid 26 is a transparent fluid having the same index of refraction as glass, the fluid employed may be opaque and the various parts arranged so that when the fluid rises in the tube 20 it will shut off the supply of light to the cell or the like 15 for the purpose of de-energizing the motor 5. In such instance the amplifier relay circuit would be suitably modified to produce the desired operation.

Various other modifications and changes may, of course, be resorted to within the spirit of this invention as defined by the appended claims, and it is to be understood that such modifications and changes are to be considered within the scope of the protection afforded by such claims.

It has been found that the device set forth in the foregoing description and in the accompanying drawing is extremely accurate even to less than one one thousandth of a degree Fahrenheit of variation in the temperature of the bath. It has further been found that the same is not affected in any substantial manner by the rough handling necessary in transporting a gravity meter instrument from place to place, and that it requires little or no adjustment.

It is to be noted that if desired, the heating coil 5 may be omitted from the set-up and heat supplied to the bath solely by the stirring effect of the mixer or stirrer. It is worthy of consideration that the presence of this stirrer serves to keep the bath in motion at all times, and thus eliminates insofar as possible the lag between the heating or cooling of the bath and the effect of this heating upon the thermal regulator. This is of advantage also in that the heat thus generated by viscous friction is generated more or less throughout the volume of the bath, and is consequently not concentrated in any given portion of the bath.

From the foregoing, it will be seen that a device has been set forth which carries out all the objects and advantages sought by this invention.

Having described my invention, I claim:

1. In a temperature regulator, means for supplying heat to a substance the temperature of which is to be regulated, light responsive means for controlling the supply of energy to said first means, and means for controlling the amount of light supplied to said light responsive means, said last mentioned means comprising a transparent capillary tube, a closed chamber connected to the lower end of said capillary tube, and a substantially transparent thermally expansible liquid within said chamber adapted to rise and fall in said capillary tube as the temperature about said chamber rises and falls, said liquid having a relatively large coefficient of expansion and substantially the same index of refraction as the material of said capillary tube.

2. In a temperature regulator, means for supplying heat to a substance the temperature of which is to be regulated, light responsive means for controlling the supply of energy to said first means, and means for controlling the light supplied to said light responsive means, said last mentioned means comprising a glass capillary tube, a chamber of highly heat conductive material connected to said capillary tube, and a body of toluene within said chamber adapted to rise and fall in said capillary tube as the temperature about said chamber rises and falls.

3. In a temperature regulator, means for supplying heat to a substance the temperature of which is to be regulated, light responsive means for controlling the supply of energy to said first means, means for controlling the amount of light supplied to said light responsive means in accordance with the temperature existing in said substance, said last mentioned means comprising a transparent capillary tube, a chamber connected with the lower end of said capillary tube and subjected to the temperature existing in said substance, and a transparent thermally expansible liquid within said chamber adapted to rise and fall in said capillary tube as the temperature about said chamber rises and falls, said capillary tube having a substantially flat outer surface on at least one side thereof.

LEWIS M. MOTT-SMITH.